United States Patent Office 3,557,204
Patented Jan. 19, 1971

3,557,204
PRODUCTION OF ARYLPHOSPHINE HALIDES
Kurt Weinberg, Upper Saddle River, N.J., assignor to Union Carbide Corporation, a corporation of New York
No Drawing. Filed Mar. 9, 1967, Ser. No. 621,763
Int. Cl. C07f 9/52
U.S. Cl. 260—543                    6 Claims

ABSTRACT OF THE DISCLOSURE

It has been discovered that arylphosphine halides can be produced by reacting an aryl halide with white phosphorus at elevated temperatures in the presence of a Lewis acid catalyst. To illustrate, chlorobenzene is reacted with white phosphorus at 340° to 350° C. in the presence of aluminum chloride catalyst to produce a mixture of phenylphosphine dichloride and diphenylphosphine chloride.

---

The invention relates to a process for the production of arylphosphine halide by reacting an aryl halide with white phosphorous in the presence of a catalytic amount of a Lewis acid.

Arylphosphine halides are valuable compositions that can be used as plasticizers, as flame retardants, and as reaction intermediates in the production of a wide variety of useful compositions such as insecticides, fuel and oil additives, and the like. Heretofore, however, there has been no satisfactory economic method for the production of this class of compositions. To illustrate, some recent preparations of arylphosphine halides include the conversion of primary phosphinic acids to arylphosphine halides by reaction with phosphorus trichloride, as disclosed by Frank, J. Org. Chem. 26, 850 (1961). Another preparation of arylphosphine halides was disclosed by Becker in U.S. Pat. No. 3,036,132. This method involved the reaction of phosphorus trichloride with M(AlR$_4$), where M is an alkali metal and R is aryl. Maier, in Helv. Chim. Actat, 46, 2026 (1963), reported the reaction of elemental phosphorus with bromobenzene at 350° C. to obtain diphenylphosphine bromide and phenylphosphine dibromide, both in very low yield. In U.S. Pat. No. 3,057,917, Maier discloses another method for the production of arylphosphines halide. In this patent, Maier reacts vaporized arylhalide with red phosphorus in the presence of major amounts of a metallic catalyst such as copper. This patent states that the use of red phosphorus is preferred, thereby implying that other forms of elemental phosphorus can also be used. However, in the paper which was cited above. Maier pointed out that the reaction methyl bromide with white phosphorus produced only traces of methylphosphine dibromide. Thus, it seems apparent that the more economical white phosphorus cannot be used in Maier's process because the yields of desired product are too low. All of the processes described above are relatively undesirable because none is an economical method for producing arylphosphine halides.

The present invention provides a useful and economical process for the production of arylphosphine halides. The inventive process comprises reacting an aryl halide with white phosphorus in the presence of a catalytic amount of a Lewis acid.

White phosphorus is employed as a reactant in this invention. The second reactant that is employed in the process of the invention is an aryl halide. The aryl halides that are employed can be represented by the formula RX$_n$ wherein R represents an aryl radical or an alkaryl radical, preferably a hydrocarbon aryl or alkaryl radical, having from 6 up to 10 or more carbon atoms and having a valence of $n$, wherein X represents a halo group, preferably a bromo, chloro, or iodo group, and wherein $n$ represents a number having a value of from 1 to 3. Specific illustrative aryl halides include chlorobenzene, bromobenzene, iodobenzene, fluorobenzene, o-dichlorobenzene, p-dichlorobenzene, trichlorobenzenes, o-chlorotoluene, m-chlorotoluene, 2,4-dichlorotoluene, 1-chloronaphthalene, 1-bromonaphthalene, bromotoluenes, iodotoluenes, 1-iodonaphthalene, and the like.

The catalysts that are employed in the process of the invention are metal halide Lewis acids. Specific illustrative examples of these catalysts include stannic tetrachloride, titanium tetrachloride, aluminum triiodide, ferric triiodide, aluminum trifluoride, ferric trifluoride, aluminum trichloride, aluminum tribromide, ferric trichloride, ferric tribromide, and the like. The preferred catalysts include ferric trichloride, aluminum trichloride, aluminum tribromide, and ferric tribromide.

The proportions of the reactants that are employed in the process of this invention are not narrowly critical. For example, the mole ratio of white phosphorus (P$_4$): aryl halide can vary from about 1:½ to 1:60, preferably from about 1:2 to 1:12, and more preferably from about 1:4 to about 1:6. The Lewis acid catalyst is employed in small catalytic quantities. For example, the catalyst can be employed in a proportion of from about 0.1 weight percent to about 3 weight percent, and preferably from about 0.2 weight percent to about 1.5 weight percent, based upon the total weight of the reactants.

The process of the invention is carried out at elevated temperatures. The exact temperature employed is dependent somewhat upon the particular nature of the aryl halide reactant. For example, when an aryl chloride is the reactant, the operable temperature range is normally from about 280° C. to about 420° C., preferably from about 300° C. to about 400° C. and more preferably from about 330° C. to 360° C. When the aryl halide is an aryl bromide, the temperature then can be employed will normally be within the range of from about 200° C. to about 450° C., preferably within the range of from about 250° C. to about 370° C., and more preferably from about 280° C. to about 300° C. When the aryl halide is an aryl iodide, the temperature range is preferably somewhat below the temperatures indicated for aryl bromides, for example, preferably from about 250° C. to about 290° C. When the aryl halide is an aryl fluoride, somewhat higher temperatures than those indicated for aryl chloride should preferably be employed. For example, a preferred temperature range when the aryl halide reactant is an aryl fluoride will be from about 400° C. to about 450° C.

The process of the invention is carried out for a period of time sufficient to produce an arylphosphine halide. The exact reaction time is dependent, in part, upon factors such as the exact nature of the reactant, the reaction temperature, and the like. For example, reaction times of from about 1 to about 50 hours can be employed, preferably from about 4 to about 26 hours, and more preferably from about 6 to about 12 hours.

The process of the invention can be carried out, for example, by adding the reactants and catalyst to a suitable reaction vessel and maintaining the mixture at the elevated reaction temperature for a period of time sufficient to produce an arylphosphine halide. If desired, the reaction can be carried out in an inert, normally liquid, reaction medium such as a high-boiling aliphatic, aromatic or cycloaliphatic hydrocarbon. However, the use of an inert organic reaction medium is entirely optional. It is in general preferred to carry out the reaction under an inert atmosphere of nitrogen, or the like. The reaction can be carried out under atmospheric pressure, superatmospheric pressure, or even subatmospheric pressure, which ever is more convenient. However, the exact pressure that will be employed is dictated to a degree by the boiling points of the aryl halide reactant, or by the boiling point of any inert reaction medium that is employed. The reaction can be carried out by gently agitating the reactants during the reaction period, and at the close of the reaction period, by cooling the reaction mixture and then separating the products by conventional methods such as by fractional distillation. The distillation will preferably be carried out under vacuum because many of the products of the reaction have relatively high boiling points.

Any suitable conventional reaction vessel can be employed for the process of the invention. The equipment should have means for heating, means for agitation, and means for cooling the reaction at the conclusion of the reaction period.

The process of the invention produces useful arylphosphine halides that are usually a mixture of an arylphosphine dihalide and a diarylphosphine monohalide. Among the useful and valuable compositions that can be produced by the process of the invention there can be named phenylphosphine dichloride, diphenylphosphine monochloride, (o-chlorophenyl)phosphine dichloride, bis(o-chlorophenyl)phosphine monochloride, 1-naphthylphosphine bromides, chlorotolylphosphine chlorides, dichlorotolylphosphine chlorides, and many other useful compositions. These compositions are useful per se as plasticizers and flame retardant additives for many types of plastics such as vinyl chloride polymers, urethane polymers, phenolic resins, and the like. The compositions that are produced by the process of the invention are also useful as reaction intermediates for the production of insecticides, lubricant oil additives, fuel additives, and the like.

The examples which follow illustrate the invention.

EXAMPLE 1

Preparation of phenylphosphine dichloride and diphenylphosphine monochloride from white phosphorus and chlorobenzene Phosphorus (6.3 g.), chlorobenzene (45 g.) and aluminum chloride (0.7 g.) were charged to a glass tube of 12-inch length and ⅞-inch I.D. After sealing, the tube was heated to about 350° C. in a 3-liter autoclave which was filled with 650 ml. of n-propanol and pressurized with 500 pounds of nitrogen. The reaction mixture was kept at that temperature (between 340 and 360° C.) for 8 hours. After cooling in liquid nitrogen, the tube was opened, its contents transferred to a distillation flask and distilled in vacuo.

Yields:
(1) 18.0 g. of phenylphosphine dichloride, B.P.: 50–55° C./0.5 mm. Hg, 49.6% of theory (based on phosphorus)
(2) 15.5 g. of diphenylphosphine monochloride, B.P.: 120–122° C./0.5 mm. Hg. 34.7% of theory (based on phosphorus)
(3) 8.6 g. of unreacted chlorobenzene Combined yields of phenylphosphine dichloride and diphenylphosphine monochloride: 84.3% of theory (based on phosphorus).

EXAMPLE 2

Preparation of (o-chlorophenyl)phosphine dichloride and di - (o - chlorophenyl)phosphine monochloride from white phosphorus and o-dichlorobenzene Phosphorus (6.3 g.), o-dichlorobenzene (60 g.) and ferric chloride (0.9 g.) were charged to a glass tube of 12-inch length and ⅞-inch I.D. After sealing, the tube was heated to about 326° C. in a 3-liter autoclave which was filled with 650 ml. of n-propanol and pressurized with 500 pounds of nitrogen. The reaction mixture was maintained at this temperature (317–332°) for 8 hours. After cooling in liquid nitrogen the tube was opened, its contents transferred to a distillation flask and distilled in vacuo.

Yields:
(1) 12.85 g. of o-chlorophenylphosphine dichloride, B.P.: 71–73° C./0.55–0.65 mm. Hg, 30.0% of theory (based on phosphorus)
(2) 9.42 g. of di - (9 - chlorophenyl)phosphine monochloride, B.P.: 147–153° C./0.5 mm. Hg, 16.4% of theory (based on phosphorus)
(3) 26.7 g. of unreacted o-dichlorobenzene Combined yields of o-chlorophenylphosphine dichloride+di - (o - dichlorophenyl)phosphine monochloride: 46.4% of theory (based on phosphorus).

EXAMPLE 3

Preparation of 1-naphthylphosphine dibromide and di-(1-naphthyl)phosphine monobromide from white phosphorus and 1-bromonaphthalene Phosphorus (6.3 g.), 1-bromonaphthalene (86 g.) and anhydrous ferric chloride (0.9 g.) were refluxed under nitrogen in a reaction flask fitted with an air cooled condenser for 6 hours at atmospheric pressure. After cooling to room temperature the reaction mixture was transferred to a distillation kettle and distilled in vacuo.

Yields:
(1) 23.08 g. of 1-naphthylphosphine dibromide, M.P.: 76–79° C., Yield: 26.2% of theory (based on phosphorus)
(2) 13.21 g. of di-(1-naphthyl)phosphine monobromide, M.P. 150–152° C., B.P. 240° C./0.5 mm., Yield: 18.1% of theory (based on phosphorus)
(3) 17.47 g. of unreacted 1-bromonaphthaline Combined yields of 1-naphthylphosphine dibromide and di-(1-naphthyl)phosphine bromide: 54.3% of theory (based on phosphorus)

EXAMPLES 4 TO 12

The reactions were run in the same equipment as described in Example 1 and also worked up in the same way. The results are summarized in the following Table I. In order to show the effect of the catalyst on the reaction, a number of experiments were carried out without catalyst (Examples 4, 7, 9 and 11) for comparison with those carried out in the presence of catalysts.

TABLE I

| Example Number | Aryl halide | Catalyst | Temp., °C. | Mole ratio of phosphorus: aryl halide | Reaction time, hours | Products | Yields in percent of theory |
|---|---|---|---|---|---|---|---|
| 4 | o-Dichlorobenzene | None | 318–332 | 1/2:2 | 8 | di-(o-Chlorophenyl)phosphine chloride | 16.0 |
|   |   |   |   |   |   | o-Chlorophenylphosphine dichloride | 20.3 |
| 5 | p-Dichlorobenzene | FeCl₃ | 318–332 | 1/2:2 | 8 | di-(p-Chlorophenyl)phosphine chloride | 16.0 |
|   |   |   |   |   |   | p-Chlorophenylphosphine dichloride | 20.2 |
| 6 | o-Chlorotoluene | FeCl₃ | 326–338 | 1/2:2 | 8 | di-(o-Methylphenyl)phosphine chloride | 13.6 |
|   |   |   |   |   |   | o-Methylphenylphosphine dichloride | 27.1 |
| 7 | do | None | 318–332 | 1/2:2 | 8 | di-(o-Methylphenyl)phosphine chloride | 0 |
|   |   |   |   |   |   | o-Methylphenylphosphine dichloride | 0 |
| 8 | m-Chlorotoluene | FeCl₃ | 318–332 | 1/2:2 | 8 | di-(m-Methylphenyl)phosphine chloride | 16.1 |
|   |   |   |   |   |   | m-Methylphenylphosphine dichloride | 16.5 |
| 9 | do | None | 318–332 | 1/2:2 | 8 | di-(m-Methylphenyl)phosphine chloride | 0 |
|   |   |   |   |   |   | m-Methylphenylphosphine dichloride | 0 |
| 10 | 2,4-dichlorotoluene | FeCl₃ | 318–332 | 1/2:2 | 8 | di-(2-chloro-6-methylphenyl)phosphine chloride | 21.4 |
|   |   |   |   |   |   | (3-chloro-4-methylphenyl)phosphine dichloride | 19.3 |
| 11 | do | None | 318–332 | 1/2:2 | 8 | di-(2-chloro-6-methylphenyl)phosphine chloride | 0 |
|   |   |   |   |   |   | (3-chloro-4-methylphenyl)phosphine dichloride | 0 |
| 12 | 1-chloronaphthalene | FeCl₃ | 326–338 | 1/2:2 | 8 | di-(1-naphthyl)phosphine chloride | 9.7 |
|   |   |   |   |   |   | (1-naphthyl)phosphine dichloride | 40.2 |

What is claimed is:

1. Process which comprises reacting an aryl halide of the formula $RX_n$ wherein R represents an aryl or an alkaryl radical having from 6 to 10 carbon atoms, X represents a halo group, and $n$ represents a number having a value from 1 to 3 with white phosphorous in the presence of a metal halide Lewis acid catalyst at an elevated reaction temperature of a period of time sufficient to produce an arylphosphine halide or an alkarylphosphine halide.

2. Process of claim 1 wherein said aryl halide is an aryl chloride, wherein the reaction temperature is in the range of from about 280° C. to about 420° C., and wherein the catalyst is a halide of aluminum or iron.

3. Process of claim 2 wherein the aryl chloride is chlorobenzene, o-dichlorobenzene, p-dichlorobenzene, o-chlorotoluene, m-chlorotoluene, 2,4-dichlorotoluene, or 1-chloronaphthalene.

4. Process of claim 1 wherein the aryl halide is an aryl bromide, wherein the reaction temperature is in the range of from about 200° to about 450° C., and wherein the catalyst is a halide of aluminum or iron.

5. Process of claim 4 wherein the aryl bromide is 1-bromonaphthalene.

6. Process of claim 1 wherein the metal halide Lewis acid catalyst is ferric trichloride, aluminum trichloride, ferric tribromide, or aluminum tribromide.

References Cited

Grayson, Organo-Phosphorus Cmpds., International Symposium, Heidelberg, 1964, pp. 193–199.

Maier, Chemical Abstracts, vol. 59, p. 14019C.

LORRAINE A. WEINBERGER, Primary Examiner

E. J. GLEIMAN, Assistant Examiner